United States Patent
Celata

(10) Patent No.: US 9,920,757 B2
(45) Date of Patent: Mar. 20, 2018

(54) VARIABLE DISPLACEMENT LUBRICANT PUMP

(71) Applicant: PIERBURG PUMP TECHNOLOGY GMBH, Neuss (DE)

(72) Inventor: Bernardo Celata, Leghorn (IT)

(73) Assignee: PIERBURG PUMP TECHNOLOGY GMBH, Neuss (DE)

(*) Notice: Subject to any disclaimer, the term of this patent is extended or adjusted under 35 U.S.C. 154(b) by 262 days.

(21) Appl. No.: 14/768,764

(22) PCT Filed: Feb. 6, 2014

(86) PCT No.: PCT/EP2014/052354
§ 371 (c)(1),
(2) Date: Aug. 19, 2015

(87) PCT Pub. No.: WO2014/128006
PCT Pub. Date: Aug. 28, 2014

(65) Prior Publication Data
US 2016/0003243 A1    Jan. 7, 2016

(30) Foreign Application Priority Data

Feb. 21, 2013  (EP) .................................... 13156173

(51) Int. Cl.
*F04C 14/22* (2006.01)
*F04C 2/344* (2006.01)
*G05D 23/275* (2006.01)

(52) U.S. Cl.
CPC .......... *F04C 14/223* (2013.01); *F04C 2/3442* (2013.01); *F04C 2270/19* (2013.01); *G05D 23/2754* (2013.01)

(58) Field of Classification Search
CPC .......... F04C 14/12; F04C 14/20; F04C 14/22; F04C 14/223; F04C 14/226; F04C 14/26;
(Continued)

(56) References Cited

U.S. PATENT DOCUMENTS 3,853,268 A * 12/1974 Schneider .............. G05D 23/10
                                                  137/625.33
4,142,676 A *  3/1979 Hattori ................... G05D 23/08
                                                  236/101 R (Continued)

FOREIGN PATENT DOCUMENTS

CN          2789919 Y     6/2006
CN         101532495 A    9/2009
(Continued)

*Primary Examiner* — Dominick L Plakkoottam
*Assistant Examiner* — Chirag Jariwala
(74) *Attorney, Agent, or Firm* — Norman B. Thot

(57) ABSTRACT

A variable displacement lubricant pump for providing a pressurized lubricant for an internal combustion engine includes a shiftable control ring, a hydraulic control chamber which directly actuates the control ring, a pump rotor comprising a plurality of slidable vanes which rotate in the control ring, a control chamber wall, a temperature control opening arranged in the control chamber wall, and a temperature control valve which connects or disconnects the temperature control opening to an atmospheric pressure. The temperature control valve comprises a valve plunger which is axially shiftable so as to block or leave open a lubricant passage, and a first bimetal actuator sheet which directly actuates the valve plunger. The first bimetal actuator sheet comprises a first switching temperature. The valve plunger is in an open position if a lubricant temperature exceeds the first switching temperature.

9 Claims, 3 Drawing Sheets

(58) Field of Classification Search
CPC ........ F04C 28/18; F04C 28/22; F04C 2/3341;
F04C 2/348; F04C 2270/18; F04C
2270/19; F04C 2270/185; F04C
2270/195; F04C 2/3442; G05D 23/275;
G05D 23/27535; G05D 23/2754
USPC ................. 417/220; 123/41.35; 137/468;
236/48 R, 101 E
See application file for complete search history.

(56) References Cited

U.S. PATENT DOCUMENTS

| | | | |
|---|---|---|---|
| 4,350,967 A | 9/1982 | Doherty, Jr. | |
| 4,378,907 A * | 4/1983 | Hashimoto | F02M 1/10 236/101 C |
| 4,561,588 A * | 12/1985 | Foller | F16T 1/08 236/59 |
| 4,586,653 A * | 5/1986 | Foller | F16T 1/08 236/48 R |
| 5,043,690 A | 8/1991 | Wahls | |
| 6,024,174 A * | 2/2000 | Pierce | A62C 37/16 169/37 |
| 2008/0038117 A1 | 2/2008 | Armenio et al. | |
| 2008/0069704 A1 | 3/2008 | Armenio et al. | |
| 2012/0183426 A1 | 7/2012 | Maffeis | |
| 2013/0025959 A1 | 1/2013 | Nonaka | |
| 2013/0039790 A1 | 2/2013 | Cuneo et al. | |
| 2013/0136641 A1 | 5/2013 | Novi et al. | |
| 2013/0263815 A1 | 10/2013 | Cuneo | |

FOREIGN PATENT DOCUMENTS

| | | | |
|---|---|---|---|
| CN | 101892981 A | 11/2010 | |
| CN | 102459903 A | 5/2012 | |
| CN | 102844570 A | 12/2012 | |
| EP | 0 398 003 A1 | 11/1990 | |
| WO | WO 2005/026553 A1 | 3/2005 | |
| WO | WO 2005/068838 A1 | 7/2005 | |
| WO | WO 2012/013232 A1 | 2/2012 | |
| WO | WO 2012013232 A1 * | 2/2012 | ............... F01M 1/02 |
| WO | WO 2012/069083 A1 | 5/2012 | |

* cited by examiner

Fig: 1
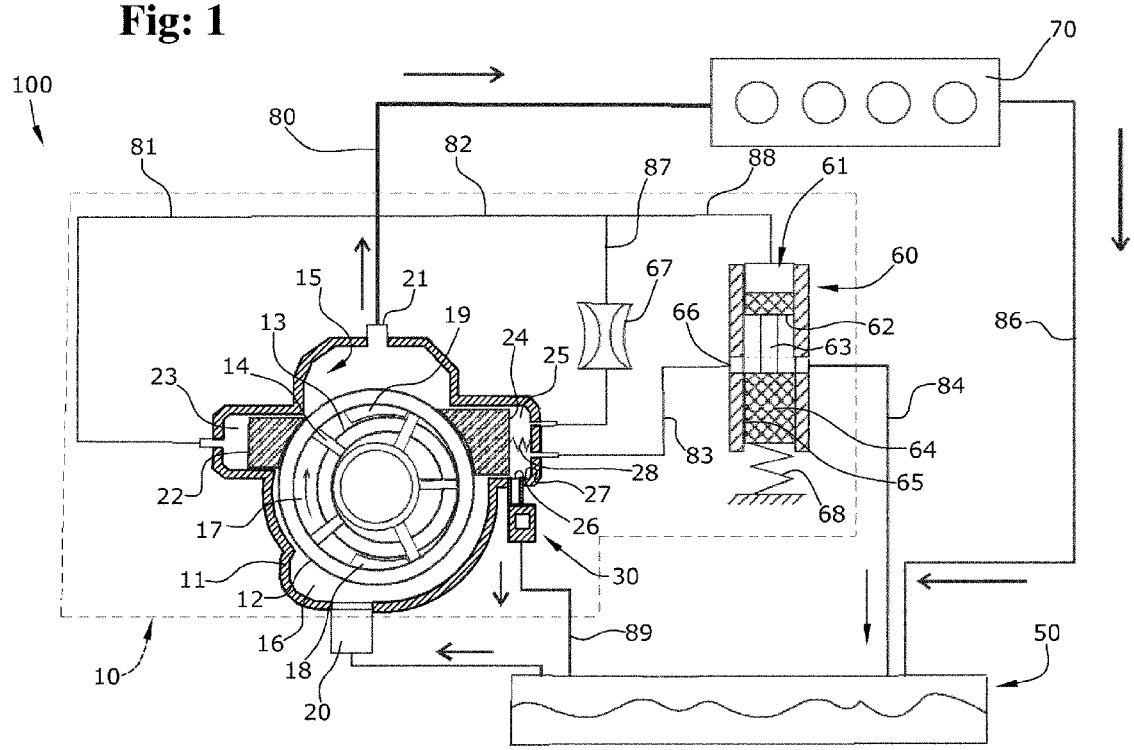

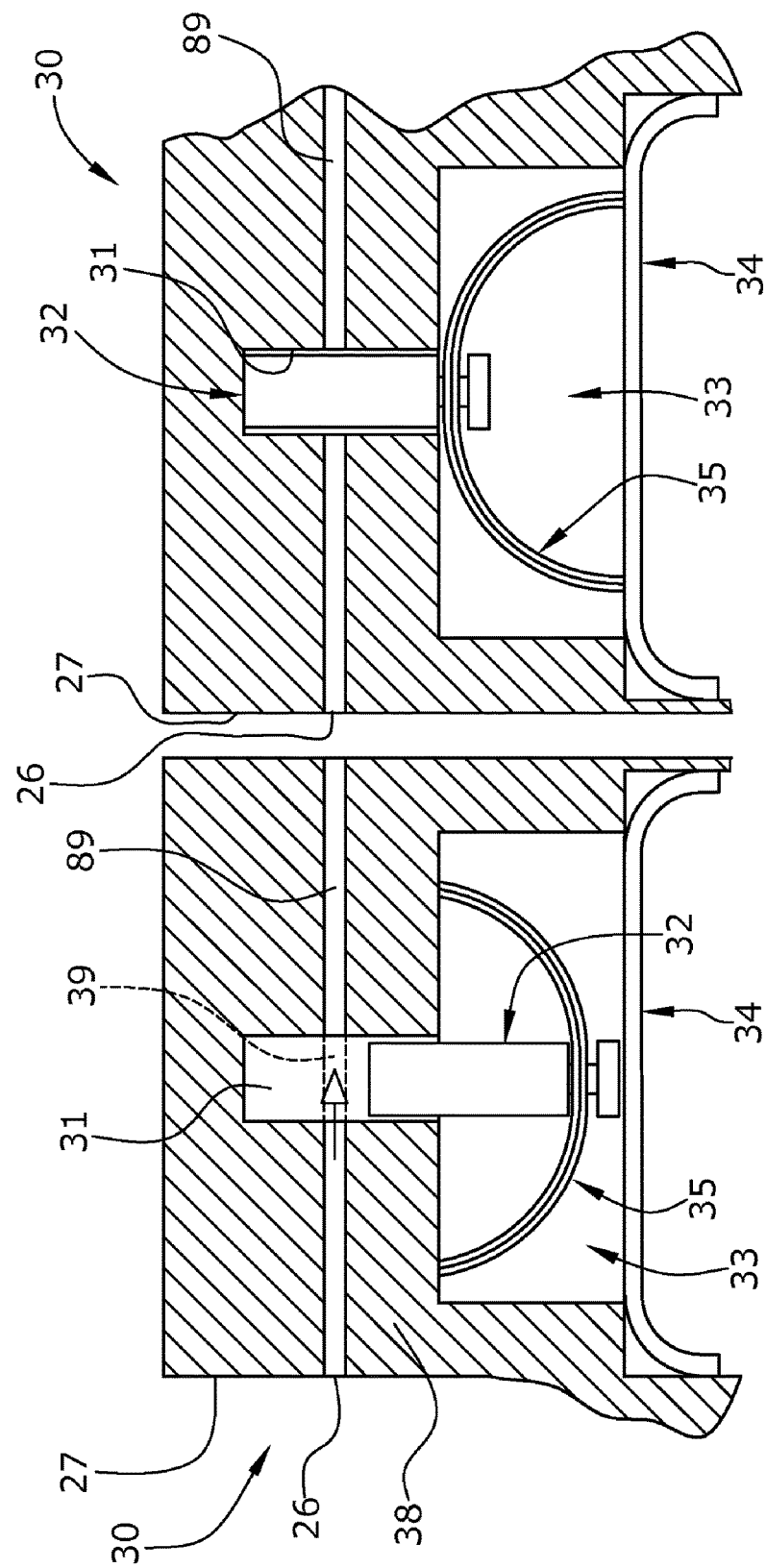

VARIABLE DISPLACEMENT LUBRICANT PUMP

CROSS REFERENCE TO PRIOR APPLICATIONS

This application is a U.S. National Phase application under 35 U.S.C. § 371 of International Application No. PCT/EP2014/052354, filed on Feb. 6, 2014 and which claims benefit to European Patent Application No. 13156173.0, filed on Feb. 21, 2013. The International Application was published in English on Aug. 28, 2014 as WO 2014/128006 A1 under PCT Article 21(2).

FIELD

The present invention relates to a variable displacement lubricant pump for providing pressurized lubricant for an internal combustion engine.

BACKGROUND

The mechanical pump comprises a pump rotor with radially slidable vanes rotating within a shiftable control ring, whereby the control ring is pushed by a plunger pushing the control ring into high pumping volume direction. The plunger is shiftably arranged in a control chamber. The pump comprises a pressure control system to control the discharge pressure of the pressurized lubricant leaving the pump. The pump's discharge pressure is controlled by controlling the position of the shiftable control ring by controlling the pressure in the hydraulic control chamber, thereby moving the plunger.

Variable displacement vane pumps of the state of the art have previously been described in WO 2005/026553 A1. The pump is provided with a pressure control system to control the discharge pressure of the lubricant. The pressure control system comprises a first pressure control chamber wherein a first plunger is provided which is axially movable. The first pressure control chamber is connected via a pressure conduit with the pump outlet port. The pressure control system also comprises a separate control element which is realized as a cylinder-piston-element which keeps the pressure of the pressurized lubricant provided by the pump at a more or less constant level, independent of the rotational speed of the pump rotor. This is realized by opening and closing a control outlet of the first pressure control chamber, thereby moving the control ring into a low pumping volume direction or pushing the control ring into a high pumping volume direction.

The lubricant pressure requirement is, however, dependent on the working conditions of the engine, such as the lubricant temperature. The lubricant pressure requirement is lower at high lubricant temperatures and higher at low lubricant temperatures.

SUMMARY

An aspect of the present invention is to provide a simple and reliable variable displacement lubricant vane pump with different lubricant pressures levels dependent on the lubricant temperature.

In an embodiment, the present invention provides a variable displacement lubricant pump for providing a pressurized lubricant for an internal combustion engine which includes a control ring configured to be shiftable, a hydraulic control chamber configured to directly actuate the control ring, a pump rotor comprising a plurality of slidable vanes which are configured to rotate in the control ring, a control chamber wall, a temperature control opening arranged in the control chamber wall, and a temperature control valve configured to connect or disconnect the temperature control opening to an atmospheric pressure. The temperature control valve comprises a valve plunger configured to be axially shiftable so as to block or leave open a lubricant passage, and a first bimetal actuator sheet configured to directly actuate the valve plunger. The first bimetal actuator sheet comprises a first switching temperature. The valve plunger is in an open position if a lubricant temperature exceeds the first switching temperature.

BRIEF DESCRIPTION OF THE DRAWINGS

The present invention is described in greater detail below on the basis of embodiments and of the drawings in which:

FIG. 1 shows a schematic representation of a variable displacement lubricant pump including a temperature control valve, the pump being arranged in a lubricant circuit including an internal combustion engine;

FIG. 2 shows a cross section of an embodiment of a temperature control valve in the open position;

FIG. 3 shows the temperature control valve of FIG. 2 in the closed position;

FIG. 4 shows an embodiment of a temperature control valve in the first closed position;

DETAILED DESCRIPTION

Figures 5, 6:
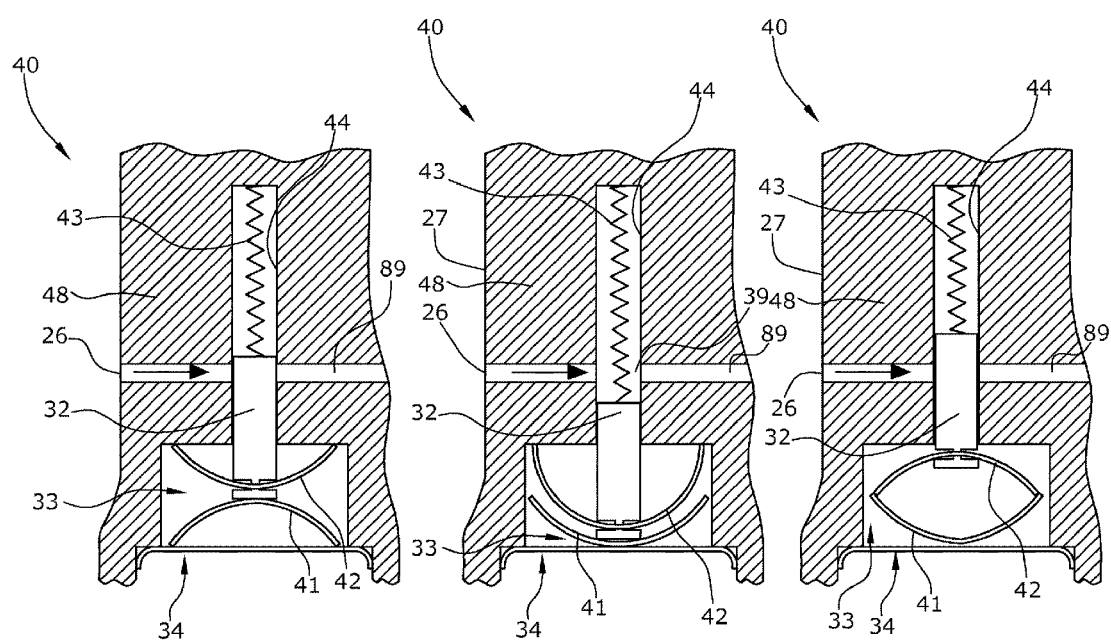
FIG. 5 shows the temperature control valve of FIG. 4 in the open position.
FIG. 6 shows the temperature control valve of FIG. 4 in a second closed position.

In an embodiment, the variable displacement lubricant vane pump of the present invention is provided with a temperature control opening in a wall of the control chamber. A temperature control valve is provided downstream of the temperature control opening which connects or disconnects the temperature control opening to atmospheric pressure, dependent on the lubricant temperature T. The temperature control valve is provided with a valve plunger which is axially shiftable and which blocks or leaves open the valves fluid passage. The valve plunger is axially shiftable in a cylinder housing which is not necessarily circular in cross-section. The cylinder housing is provided with an inlet opening and/or an outlet opening which is, dependent on axial plunger position, covered or not covered by the plunger.

The plunger is directly actuated by a first bimetal actuator sheet which has a first switching temperature TS1 so that the valve plunger is in its open position leaving the fluid passage open if the lubricant temperature T is above the first switching temperature TS1. The bimetal actuator sheet can be slightly convex or concave dished to provide strict switching characteristics and to avoid a continuous actuation of the plunger proportional to the lubricant temperature T. The bimetal sheet switch can be provided with a switching hysteresis of some degrees Celsius.

The actuation forces can be relatively low since the actuator is provided separately from the movable valve body which is defined by the valve plunger. Using a separate valve plunger allows a bimetal actuator sheet to be used which generates relatively low actuation forces, as a valve actuator, and also provides high reliability.

In an embodiment of the present invention, the plunger can, for example, be connected to the middle area of the first actuator sheet. If the actuator sheet is provided as a strip, the middle of the longitudinal extension of the actuator sheet is connected to the plunger. If the actuator is provided as a dish can, the center of the condition is fixed to the plunger.

In an embodiment of the present invention, a second bimetal switching sheet with a second switching temperature TS2 different from the first switching temperature TS1 can, for example, be provided. The first and the second switching sheet interact so as to open the fluid passage if the lubricant temperature T is between the first switching temperature TS1 and the second switching temperature TS2. The valve is closed if the lubricant temperature is below the second switching temperature TS2 or above the first switching temperature TS1.

In an embodiment of the present invention, the first switching temperature TS1 can, for example, be between 60° C. and 120° C., and can, for example, be around 90° C. The second switching temperature TS2 can, for example, be below 20° C., and can, for example, be around 0° C.

In an embodiment of the present invention, a separate preload spring can, for example, be provided which pushes the valve plunger into its open position. The preload spring provides a fail-safe function because the plunger is forced by the preload spring into its open position if the actuator sheet is damaged, broken, etc.

In an embodiment of the present invention, the switching sheet of the switching sheets can, for example, be arranged within a sheet chamber and are not fixed to the sheet chamber. The sheet chamber can, for example, be closed fluid-tight by a separate covered chamber. The chamber cover closes the valve hermetically so that no lubrication leakage can occur.

In an embodiment of the present invention, the temperature control opening can, for example, be provided at a side wall of the control chamber and a plunger element of the control ring can, for example, be provided to shift along the side wall so as to cover or to not cover the control opening.

The following is a detailed description of an embodiment of the present invention under reference to the drawings.

FIG. 1 shows a variable displacement lubricant pump 10 as a part of a pumping system 100 for supplying an internal combustion engine 70 with pressurized lubricant. From the internal combustion engine 70, the lubricant flows back via a flow-back conduit 86 to a lubricant tank 50 with more or less atmospheric pressure.

The pump 10 comprises a pump housing 11 having a cavity 16 in which a radially-shiftable control ring 12 translates. The control ring 12 encircles a pump rotor 13 which is provided with numerous radially-slidable vanes 14, whereby the vanes 14 rotate inside the control ring 12. The pump housing 11 comprises two pump side walls 15 of which one is not shown in FIG. 1 to allow the inside of the pump 10 to be seen. The pump side walls 15, the vanes 14, the pump rotor 13, and the control ring 12 define five rotating pump chambers 17. More or fewer pump chambers can alternatively be provided. One of the pump side walls 15 is provided with a pump chamber inlet opening 18 and with a pump chamber outlet opening 19.

The control ring 12 is provided with a first plunger 24 housed in part in a first hydraulic control chamber 25, and with a second plunger 22 housed in part in a second hydraulic control chamber 23 opposite to the first control chamber 25.

A pre-tensioned spring 28 inside the first hydraulic control chamber 25 exerts a pushing force to the first plunger 24.

Both hydraulic control chambers 25, 23 are formed inside and by the pump housing 11. The pump housing 11 also comprises a pump intake port 20 to suck the lubricant from the lubricant tank 50 and a pump outlet port 21 to feed lubricant with a discharge pressure to the internal combustion engine 70. A conduit 80 extends from the pump outlet port 21 to supply the internal combustion engine 70.

The lubricant, which is supplied to the internal combustion engine 70, is conducted to the second hydraulic control chamber 23 via a pressure conduit 81, and the lubricant is fed to the first pressure control chamber 25 via pressure conduits 82, 87. More specifically, the lubricant in pressure conduit 82 is finally fed to the first pressure control chamber 25 via pressure conduit 87 through a pressure throttle valve 67 in which a calibrated pressure drop occurs as the lubricant flows therethrough.

The pressure conduits 82, 88 are connected a first pressure control valve 60 by a conduit 88. The first pressure control valve 60 comprises a cylinder 65 housing a piston 61. More specifically, the piston 61 comprises a first portion 62 and a second portion 64 connected to each other by a rod 63. The piston 61 is pre-tensioned by a pre-tensioning element 68 which can, for example, be provided as a spring. The piston portions 62 and 64 are in cross section equal to cross section of the cylinder 65, whereas the rod 63 is smaller in cross section than the cylinder 65. The cylinder 65 is provided with an inlet port 66 connected hydraulically to the first hydraulic control chamber 25 by a conduit 83 and is provided with an outlet port which is hydraulically connected to the lubricant tank 50 by a conduit 84. Conduit 88 transfers the discharge pressure in pressure conduit 82 to the front surface of the first portion 62 of piston 61. The dashed line in FIG. 1 shows the situation when the inlet port 66 of the first pressure control valve 60 is closed by the second portion 64 of the piston 61.

The first hydraulic control chamber 25 is provided with a temperature control opening 26 connected hydraulically to a temperature control valve 30. The temperature control opening 26 is provided in a side wall 27 of the first hydraulic control chamber 25 so that the first plunger 24, sliding along the side wall 27, thereby covers and closes the temperature control opening 26 or leaves the temperature control opening 26 open, dependent on the plunger position inside the first hydraulic control chamber 25. If the temperature control valve 30 is open, the first hydraulic control chamber 25 is connected to the lubricant tank 50 having atmospheric pressure.

A first embodiment of the temperature control valve 30 is shown in FIGS. 2 and 3. The temperature control valve 30 is arranged downstream of the temperature control opening 26 and connects or disconnects, dependent on the lubricant temperature T, the temperature control opening 26 to the atmospheric pressure of the lubricant tank 50 via a lubricant conduit 89 connecting the temperature control valve 30 with the lubricant tank 50.

The temperature control valve 30 comprises a valve housing body 38 which is an integral part of the pump housing 11 which can be made of metal. The pump housing 11 can alternatively be made of plastic. The lubricant inlet of the temperature control valve 30 is directly connected to and is defined by the temperature control opening 26 at the side wall 27 of the first hydraulic control chamber 25. The temperature control valve 30 comprises a plunger cylinder 31, wherein a valve plunger 32 is arranged so as to be axially shiftable. The plunger cylinder 31 defines a lubricant passage 39 which can be blocked or left open by the valve plunger 32. In the open plunger position of the valve plunger 32, which is shown in FIG. 2, the valve plunger 32 allows the lubricant to flow from the first hydraulic control chamber 25 through the temperature control valve 30 and the lubricant conduit 89 to the lubricant tank 50, which is under atmospheric pressure.

The valve housing body 38 also comprises a pump sheet chamber 33 which is closed by a separate chamber cover 34. Inside the pump sheet chamber 33, a longitudinal and strip-like bimetal actuator sheet 35 is provided which is, in two dimensions, formed convex and dish-like, so that the bimetal actuator sheet 35 acts as a mechanical switch with a defined switching temperature TS1. The bimetal actuator sheet 35 has a switching temperature TS1 of about 90° C. so that the bimetal actuator sheet 35 switches at temperatures above 90° C. into its closed status and form, as shown in FIG. 3. The middle area of the bimetal actuator sheet 35 is provided with an opening which is held by and fixed to the valve plunger 32.

FIGS. 4 to 6 show a second embodiment of a temperature control valve 40. The temperature control valve 40 comprises a valve housing body 48 which is an integral part of the pump housing 11. The lubricant inlet of the temperature control valve 40 is connected to and defined by the temperature control opening 26 at the side wall 27 of the first hydraulic control chamber 25. The temperature control valve 40 comprises a plunger cylinder 44, wherein the valve plunger 32 is arranged so as to be axially shiftable. The plunger cylinder 44 defines a lubricant passage 39 which can be blocked or left open by the valve plunger 32. In the open plunger position of the valve plunger 32, which is shown in FIG. 5, the valve plunger 32 allows the lubricant to flow from the first hydraulic control chamber 25 through the temperature control valve 30 and the lubricant conduit 89 to the lubricant tank 50, which is under atmospheric pressure. The valve plunger 32 is preloaded into its open position, shown in FIG. 5, by a preload spring 43.

The valve housing body 48 also comprises and defines a pump sheet chamber 33 which is closed by a separate chamber cover 34. Inside the pump sheet chamber 33, two longitudinal and strip-like bimetal actuator sheets 41,42 are arranged in parallel which are, in two dimensions, formed convex and dish-like so that the bimetal actuator sheets 41,42 act as mechanical switches with defined switching temperatures TS1,TS2. The first bimetal actuator sheet 42 has a switching temperature TS1 of about 90° C. so that the first bimetal actuator sheet 42 switches at temperatures above 90° C. into its closed status and form, as shown in FIG. 6. The second bimetal actuator sheet 41 has a switching temperature TS2 of about 0° C. so that the second bimetal actuator sheet 41 switches at temperatures below 0° C. into its closed status and form, as shown in FIG. 4. The middle area of the first bimetal actuator sheet 42 is provided with an opening which is held by and fixed to the valve plunger 32.

The valve plunger 32 is therefore in its open position only at lubricant temperatures between 0° C. and 90° C. as shown in FIG. 5.

The present invention is not limited to embodiments described herein; reference should be had to the appended claims.

What is claimed is:

1. A variable displacement lubricant pump for providing a pressurized lubricant for an internal combustion engine, the variable displacement lubricant pump comprising:

a control ring configured to be shiftable;
a hydraulic control chamber configured to directly actuate the control ring;
a pump rotor comprising a plurality of slidable vanes which are configured to rotate in the control ring;
a control chamber wall;
a temperature control opening arranged in the control chamber wall; and
a temperature control valve configured to connect or disconnect the temperature control opening to an atmospheric pressure, the temperature control valve comprising,
 a valve plunger configured to be axially shiftable so as to block or leave open a lubricant passage,
 a first bimetal actuator sheet configured to directly actuate the valve plunger, the first bimetal actuator sheet comprising a first switching temperature, and
 a second bimetal switching sheet comprising a second switching temperature which is different from the first switching temperature,
wherein,
the valve plunger is in an open position if a lubricant temperature exceeds the first switching temperature,
the valve plunger is held by and fixed to a middle area of the first bimetal actuator sheet, and
the first bimetal switching sheet and the second bimetal switching sheet are configured to interact with each other so as to open the lubricant passage if the lubricant temperature is between the first switching temperature and the second switching temperature.

2. The variable displacement lubricant pump as recited in claim 1, wherein the first bimetal actuator sheet has a convex shape or a concave shape so as to provide the first switching temperature.

3. The variable displacement lubricant pump as recited in claim 1, wherein the first switching temperature is between 60° C. and 120° C.

4. The variable displacement lubricant pump as recited in claim 1, wherein the first switching temperature is between 80° C. and 100° C.

5. The variable displacement lubricant pump as recited in claim 1, wherein the second bimetal actuator sheet has a convex shape or a concave shape so as to provide the second switching temperature.

6. The variable displacement lubricant pump as recited in claim 1, wherein the second switching temperature is below 20° C.

7. The variable displacement lubricant pump as recited in claim 1, further comprising a separate preload spring configured to push the valve plunger into an open plunger position.

8. The variable displacement lubricant pump as recited in claim 1, further comprising:
a sheet chamber,
wherein, the first bimetal switching sheet and the second bimetal switching sheet are arranged within the sheet chamber and are not fixed to the sheet chamber.

9. The variable displacement lubricant pump as recited in claim 8, further comprising:
a separate chamber cover,
wherein, the separate chamber cover is configured to close the sheet chamber so as to be fluid-tight.

* * * * *